(12) United States Patent
Caicedo-Carvajal et al.

(10) Patent No.: US 10,449,750 B2
(45) Date of Patent: Oct. 22, 2019

(54) SURFACE ADHESIVE FOR DEVICES

(71) Applicant: Orthobond Corporation, North Brunswick, NJ (US)

(72) Inventors: Carlos Caicedo-Carvajal, North Brunswick, NJ (US); Randy Clevenger, North Brunswick, NJ (US); Sam Hong, Glen Ridge, NJ (US); Jordan Katz, Short Hills, NJ (US); Cheoljin Kim, North Brunswick, NJ (US)

(73) Assignee: Orthobond Corporation, North Brunswick, NJ (US)

( * ) Notice: Subject to any disclaimer, the term of this patent is extended or adjusted under 35 U.S.C. 154(b) by 671 days.

(21) Appl. No.: 14/591,483

(22) Filed: Jan. 7, 2015

(65) Prior Publication Data

US 2015/0190983 A1 Jul. 9, 2015

Related U.S. Application Data

(60) Provisional application No. 61/924,489, filed on Jan. 7, 2014.

(51) Int. Cl.
*B32B 7/12* (2006.01)
*C09J 175/14* (2006.01)
(Continued)

(52) U.S. Cl.
CPC .............. *B32B 7/12* (2013.01); *B32B 5/06* (2013.01); *B32B 7/10* (2013.01); *B32B 27/06* (2013.01); *B32B 27/08* (2013.01); *B32B 27/16* (2013.01); *B32B 27/281* (2013.01); *B32B 27/285* (2013.01); *B32B 27/288* (2013.01); *B32B 27/308* (2013.01); *B32B 27/34* (2013.01); *B32B 27/36* (2013.01); *B32B 27/38* (2013.01);
(Continued)

(58) Field of Classification Search
CPC .. B32B 5/06; B32B 7/12; B32B 27/06; B32B 27/08; B32B 27/16; B32B 27/281; B32B 27/285; B32B 27/288; B32B 27/308; B32B 27/34; B32B 27/36; B32B 27/38; B32B 27/40
USPC ........ 427/535, 569; 428/221, 426, 428, 433, 428/446, 457
See application file for complete search history.

(56) References Cited

U.S. PATENT DOCUMENTS 4,765,860 A * 8/1988 Ueno .................. B32B 38/0008
156/272.6
5,180,766 A 1/1993 Hayama et al.
(Continued)

FOREIGN PATENT DOCUMENTS

| EP | 0251490 | 1/1988 |
|---|---|---|
| EP | 0889105 | 1/1999 |
| WO | 2013139342 | 9/2013 |

OTHER PUBLICATIONS

International Search Report and Written Opinion for PCT Application No. PCT/US2015/010451 dated Apr. 7, 2015, 17 pages.
(Continued)

*Primary Examiner* — Matthew D Matzek
(74) *Attorney, Agent, or Firm* — Venable LLP (57) ABSTRACT

Disclosed in certain embodiments is a composition comprising a first material; an adhesive material attached to the first material; a plurality of linker molecules bonded to the adhesive material; and a second material bonded to the linker molecules.

17 Claims, 7 Drawing Sheets

(51) Int. Cl.

| | | |
|---|---|---|
| *B32B 27/08* | (2006.01) | |
| *B32B 27/16* | (2006.01) | |
| *B32B 27/28* | (2006.01) | |
| *B32B 27/36* | (2006.01) | |
| *B32B 5/06* | (2006.01) | |
| *B32B 27/30* | (2006.01) | |
| *B32B 27/34* | (2006.01) | |
| *B32B 27/38* | (2006.01) | |
| *B32B 27/40* | (2006.01) | |

(52) U.S. Cl.
CPC ............ *B32B 27/40* (2013.01); *C09J 175/14* (2013.01); *B32B 2250/02* (2013.01); *B32B 2250/03* (2013.01); *B32B 2255/06* (2013.01); *B32B 2255/10* (2013.01); *B32B 2255/24* (2013.01); *B32B 2255/26* (2013.01); *B32B 2255/28* (2013.01); *B32B 2307/542* (2013.01); *B32B 2535/00* (2013.01); *Y10T 428/249921* (2015.04); *Y10T 428/31678* (2015.04)

(56) References Cited

U.S. PATENT DOCUMENTS

| | | | |
|---|---|---|---|
| 5,302,669 A | | 4/1994 | Furukawa et al. |
| 5,639,555 A | * | 6/1997 | Bishop .............. B32B 5/24 |
| | | | 428/447 |
| 6,503,359 B2 | | 1/2003 | Virtanen |
| 6,787,244 B2 | | 9/2004 | Sezi et al. |
| 7,135,979 B2 | | 11/2006 | Savagian et al. |
| 8,614,003 B2 | | 12/2013 | Ma et al. |
| 2007/0225387 A1 | | 9/2007 | Mayadunne et al. |
| 2008/0186691 A1 | * | 8/2008 | Mertz .............. A61N 1/05 |
| | | | 361/796 |
| 2009/0026407 A1 | | 1/2009 | Tomlinson et al. |
| 2009/0056991 A1 | * | 3/2009 | Kuhr .............. C08J 7/065 |
| | | | 174/256 |
| 2010/0215643 A1 | | 8/2010 | Clevenger et al. |
| 2012/0231245 A1 | | 9/2012 | Kim et al. |
| 2012/0283375 A1 | | 11/2012 | Kageyama |
| 2013/0017246 A1 | | 1/2013 | Tunius |
| 2013/0129982 A1 | * | 5/2013 | Ma .............. C08J 7/16 |
| | | | 428/161 |
| 2013/0327564 A1 | * | 12/2013 | Yu .............. H05K 3/108 |
| | | | 174/262 |

OTHER PUBLICATIONS

International Search Report for PCT Application No. PCT/US2015/010451 dated Sep. 1, 2017, 8 pages.

\* cited by examiner

SURFACE ADHESIVE FOR DEVICES

FIELD OF INVENTION

The present disclosure is directed to adhesives and linkers for the connection of two materials (e.g., polymers).

BACKGROUND

Material interfaces are ubiquitous features on many types of devices. As a result, constant use of different materials must be considered to achieve specific functions within in the device. In order for some of these devices to function, various materials must be attached to one another. One common way of attachment is to use an adhesive.

The selection of a proper adhesive is dependent on many different factors, including the materials being joined together, curing time, bonding strength, final use of the product, among others. Each of these factors can limit the applicability of adhesives, especially if the adhesive is needed for a specific material or for a sensitive use. Depending on the particular factors, an adhesive may be ideally suited for one situation and may not be functional in another.

An important consideration in the efficacy and duration of an adhesive bond is the surface of the materials to be used. In some instances, surface preparation allows the adhesive to form bonds with the actual surface of the material and not to other substances or debris located on the material. Often, bonding is dependent on intermolecular interactions between the surface of the material and the adhesive. Given that different materials will have varying characteristics, however, the quality of bonding between an adhesive and two dissimilar materials may be very different.

A current limitation with many adhesive systems is a lack of control over the reaction rate which can lead to adhesives setting too rapidly or too slowly for optimal performance. When considering bonding of an adhesive to a surface the reaction must proceed at a rate which allows integration of surface functionalities into the bulk reaction of the adhesive. However, if the reaction proceeds too slowly micromotion may interfere with good surface bonding and/or unacceptable time may be needed before an interface can be functionally bonded.

In addition, adhesives used for medical devices must also consider the possible toxicity of the adhesive to humans and, if implantable, sterility and how the adhesive will react to the conditions within the human body. Medical devices have a wide range of possible applications which require adhesives, including but not limited to, diagnostic products, implants, surgical instruments, dental articles, among others. Recently, certain types of equipment, including items such as surgical instruments and catheters, have become reusable. The reusable nature of these types of products would subject any adhesives used in these devices to the process of cleaning and sterilization over repeated times.

There exists a need in the art for compositions and methods for bonding two materials in the preparation of a device (e.g., a medical device).

OBJECTS AND SUMMARY OF THE INVENTION

It is an object of certain embodiments of the present invention to provide a composition where an adhesive material is attached to a first material and where a plurality of linker molecules binds to the adhesive material and also binds to a second material It is an object of certain embodiments of the present invention to provide a composition where a material is treated so that linker molecules can form bonds between an adhesive and the treated material.

It is an object of certain embodiments of the present invention to provide a composition where two dissimilar materials are adhesively bonded together.

It is an object of certain embodiments of the present invention to provide a composition to increase the strength of an adhesive bond between two materials.

It is an object of certain embodiments of the present invention to provide a composition to use an adhesive between two materials in a medical device.

It is an object of certain embodiments of the present invention to provide a preparation for a composition to bond two materials together with an adhesive.

It is an object of certain embodiments of the present invention to provide a preparation for a composition to bond two materials together with an adhesive using surface modifications which allow for a greater time during which the adhesive can effectively bond the surface.

DETAILED DESCRIPTION

The present invention is directed to a composition that in certain embodiments comprises two materials bonded together through an adhesive and linker molecules. In one aspect, the adhesive is bonded to the functional groups of one of the materials and the adhesive is also bound to linker molecules. The linker molecules are then further bonded to functional groups of the second material. The surface of the materials can be modified, such as using oxygen or other gas plasmas, to increase the number of functional groups available to form bonds between the adhesive and/or linker molecules. Gas plasma functions by forming an environment which promotes the formation of hydroxyl, amine, carbonyl and carboxyl groups. The additional functional groups facilitate the binding of the adhesive and/or linker molecules to the treated materials.

The first and second materials may be selected from, but not limited to, a polymer, a metal, a ceramic, an alloy, a silicon, a glass and/or a fabric and may or may not be different from one another. In certain embodiments, the first and/or second material can be an in-vivo or ex-vivo biological such as a bone, ligament, tendon, etc.

In certain embodiments, the first and/or second material or the surface of the first and/or second material may be a polymer and may be selected from the group consisting of polyamides, polyimides, polyurethanes, polyureas, polyamines, polyepoxides, polyesters, polysulfonamides and polysulfides. Preferably, the polymer would be polyethylene terephthalate (PET), polyetheretherketones (PEEK), polyetherketoneketones (PEKK) or nylon. Preferably one the material polymer is polyethylene terephthalate and the other material is poly-(4,4'-oxydiphenylene-pyromellitimide).

In certain embodiments, the first and/or second material or the surface of the first and/or second material may be a metal and may include, but is not limited to, titanium, stainless steel, cobalt chrome, nickel, molybdenum, tantalum, zirconium, magnesium, manganese, niobium or alloys thereof.

The adhesive may be applied to the first and/or second materials and may be the same or a different material. The adhesives may include, but are not limited to, UV light curable adhesives, epoxy resins, cyanoacrylates, a bone cement such as a polymethylmethacrylate, or activator-cured adhesives. In certain embodiments, the adhesive would be acrylated urethane. In a particular embodiment, the invention is directed to a metal bound with a bone cement such as polymethylmethacrylate and linker molecules.

In one embodiment, once the adhesive is applied to the surface of the first and/or second materials, linker molecules are added to form covalent bonds between the adhesive and the second material. The linker molecules may be applied to the adhesive on the first and/or second material and may be the same or different linkers. Optionally, the surface of one or both of the materials may be treated to create additional functional groups, such as hydroxyl, amine, carbonyl and carboxyl groups. One such treatment is exposure to oxygen plasma. The additional functional groups may increase the number of single or double covalent bonds created between a linker molecule and the surface of the material. The increase in the number of bonds may enhance the strength of the connection between the first and second materials.

In another embodiment, the first and second materials may be optionally treated (i.e. with oxygen plasma) to increase the number of functional groups that may bond with the linker molecules. Linker molecules are then added to bond with the first and second materials. The linker molecules added to the first and second materials may be the same or may be different linkers. After the additional of linker molecules to the first and second materials, an adhesive may be added to bond both the linker molecules attached to the first and second materials. The functional groups found on the linkers may then help to cure the adhesive.

In another embodiment, linker molecules added to the first and/or second materials may be subsequently primed so that the surface is more amenable to participating in the polymerization process of the adhesive. In this embodiment, the surface activation is independent of the activation of the adhesive. The primer can be, e.g., a monomer, an oligomer, a peroxyacid, an activator, a radical initiator or a combination thereof. In certain embodiments, the primer comprises a compound selected from the group consisting of benzoyl peroxide, methylmethacrylate monomer or oligomer, benzophenone and a combination thereof. In certain embodiments, the primer is selected to comport with the polymerization or curing chemistry of the adhesive. Specifically, when using an acrylate based adhesive such as polymethylmethacrylate, coating the surface with a mixture of MMA monomer/benzoyl peroxide prior to contact with the adhesive will increase the working time during which the adhesive can effectively bond to the surface.

In another embodiment, brush polymerization is used to achieve an increased density of functional moieties capable of bonding to the adhesive per unit surface area. This strategy increases the reactivity of the surface and allows effective bonding with rapidly setting adhesives as well as with improperly formulated adhesives containing suboptimal proportions of monomer.

The linker molecules may be, but not limited to, a silane moiety, a trimethoxysilane moiety, a radical of a silane acrylate, a trimethoxysilane acrylate, a mercaptosilane moiety, a mercaptoalkylsilane moiety, a radical of mercaptopropyltrimethoxysilane, an acryoyl moiety, a radical of an acryoyl halide, a radical of acryoyl chloride, an alkylene moiety, a phosphonic acid or a radical of propylene.

The combination of the adhesive with the linker molecule may increase the strength of the connection between the first and second materials, as compared to the adhesive alone. The force between the first and second materials can range, e.g., from about 1N to about 12N. In other embodiments, the force between the first and second materials may be greater than about 1N, greater than about 4N, greater than about 5N, greater than about 6N, greater than about 8N, greater than about 1ON or greater than about 12N. In other embodiments, the force between the first and second materials is greater than 100N, greater than 500N, greater than 1000N, greater than 2,500 N or greater than 5,000N. in other embodiments the force between the first and second materials is from about 1N to about 5,000N, from about 5N to about 3,000N or from about 10N to about 2,000N.

The combination of the adhesive with the linker molecule may increase the strength of the connection between the first and second materials, as compared to the adhesive alone. The adhesion strengths can range, e.g., from about 1 Pa to about 1 MPa. In other embodiments, the strength between the first and second materials may be greater than about 1 MPa, greater than about 4 MPa, greater than about 5 MPa, greater than about 6 MPa, greater than about 8 MPa, greater than about 1OMPa or greater than about 12 MPa. In other embodiments, the adhesive strength between the first and second materials is greater than 100 MPa. In certain embodiments, the adheice strength between the first and second materials is from about 1 Pa to about 500MPa., from about 1 MPa to about 300 MPa or from about 5 MPa to about 200 MPa.

The combination of the adhesive with the linker molecule may increase the strength of the connection between the first and second materials, as compared to the adhesive alone. The strength may be increased from about 2× to about 10×. In other embodiments, the strength of the connection between the first and second materials may be greater than about 3×, greater than about about 4×, greater than about 5×, greater than about 6×, greater than about 8×, greater than about 10× or greater than about 100×. In certain embodiments, the strength of the connection between the first and second materials is from about 2× to about 500×, from about 3× to about 300 MPa or from about 10× to about 100×.

The invention may be particularly applicable to medical devices. Medical devices are often made of different material types and are required to be rigorous enough to withstand conditions in the human body but must not be harmful to the patient. By virtue of the present invention, the strength of the adhesive bonds between materials and longevity of the medical device may be increased and the risk of harm to a patient may be reduced. Medical devices that may utilize the invention include, but are not limited to, implantable medical devices, vascular devices, artificial hearts and heart assist devices, orthopedic devices, dental devices, drug delivery devices, ophthalmic devices, urological devices, catheters, neurological devices, neurostimulation devices, electrostimulation devices, electrosensing devices and synthetic prostheses, vascular devices, artificial hearts and heart assist devices, orthopedic devices, dental devices, implantable medical device is a dental device or an orthopedic device, vascular device and is selected from the group consisting of grafts, stents, stent grafts, catheters, valves, artificial hearts, pacemakers, fracture repair device and artificial tendon, glaucoma drain shunt, penile devices, sphincter devices, urethral devices, bladder devices, renal devices, breast prostheses, artificial organs, dialysis tubing and membranes, blood oxygenator tubing and membranes, blood bags, sutures, membranes, cell culture devices, chromatographic support materials, biosensors, anastomotic connectors, surgical instruments, angioplasty balloons, wound drains, shunts, tubing, urethral inserts, blood oxygenator pumps, wound tubing, electrical stimulation leads, brain tissue stimulators, central nerve stimulators, peripheral nerve stimulators, spinal cord nerve stimulators and sacral nerve stimulators.

The invention also teaches a method of preparing a composition of two materials bonded together using an adhesive and linker molecules as disclosed herein.

The invention teaches a method of treating a patient using a composition of two materials bonded together using an adhesive and linker molecules where the two materials are part of an implanted medical device as disclosed herein.

EXAMPLES

Example 1

Solvent Deposition of Acryoyl Chloride on a Polyimide Surface

Insulation in the form of a polyimide film (Kapton®) (1-inch by 3-inches) were air plasma treated for 10 minutes at 4 Ton (0.5% Atmosphere) using a Herrick Plasma Cleaning Machine. A surface treatment solution was made using 70-ml of dichloromethane (DCM), triethylamine (Et3N) and acryloyl chloride under static conditions for 10 minutes at -20° C. The solution was stirred for 2 minutes. The polyimide film samples were then transferred into the surface treatment solution and shaken for 18 hours. After 18 hours of surface treatment, the treated polyimide film samples were washed/sonicated with DCM, following with a second wash with reagent alcohol and blow drying process. Below is a schematic of the chemical process involved during acryoyl chloride functionalization of polyimide film samples.

Example 2

Chemical Vapor Deposition of 3-(Trimethoxysilyl)Propyl Methacrylate on Polyimide Film (Kapton®)

Insulation in the form of polyimide film (Kapton®) (1-inch by 3-inches) were cut and wiped with ethanol, following by sonication in a 1:1 water/ethanol mixture for 15 minutes, then in ethanol for 15 minutes. Samples were blown dry. Cleaned polyimide film samples were placed in a Harrick Plasma Cleaning Machine for 5 minutes at ~1 Torr using "High" energy setting. Plasma treated polyimide film samples were placed in a desiccator with 1-2 ml of 3-(trimethoxysilyl)propyl methacrylate in a vial next to the polyimide film samples. The desiccator was connected to a vacuum pump to start chemical vapor deposition (CVD) for 3 hours After 3 hours, the CVD-treated polyimide film was placed under high vacuum for 1 hour as a post-annealing step. The schematic below is a basic representation of the chemical process involved during silane functionalization of polyimide samples.

Chemical vapor deposition of silane on polyimide film (Kapton®).

Example 3

In-house Peel Test Device and Sample Preparation

Figure 1:
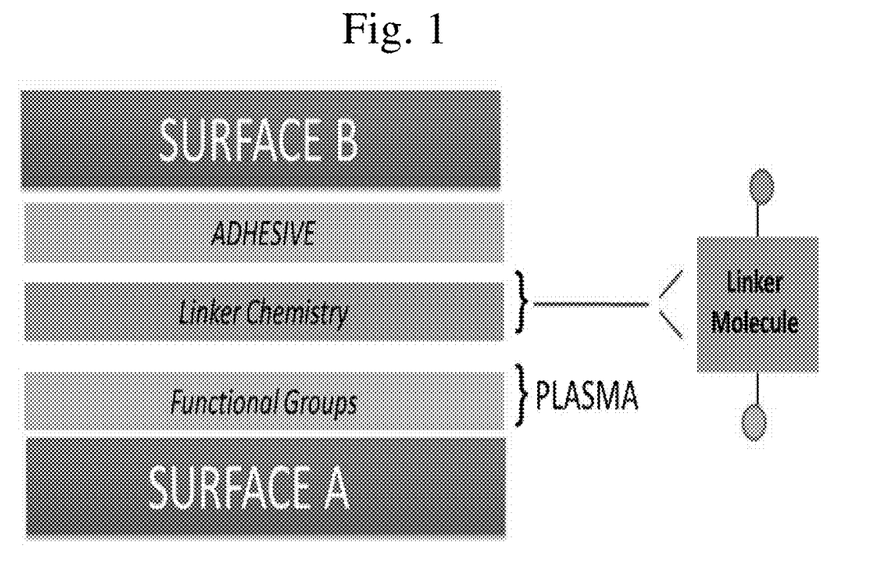
FIG. 1 is a schematic of combinatorial and dual linker molecule approach to increase interfacial adhesion.
Figure 2:
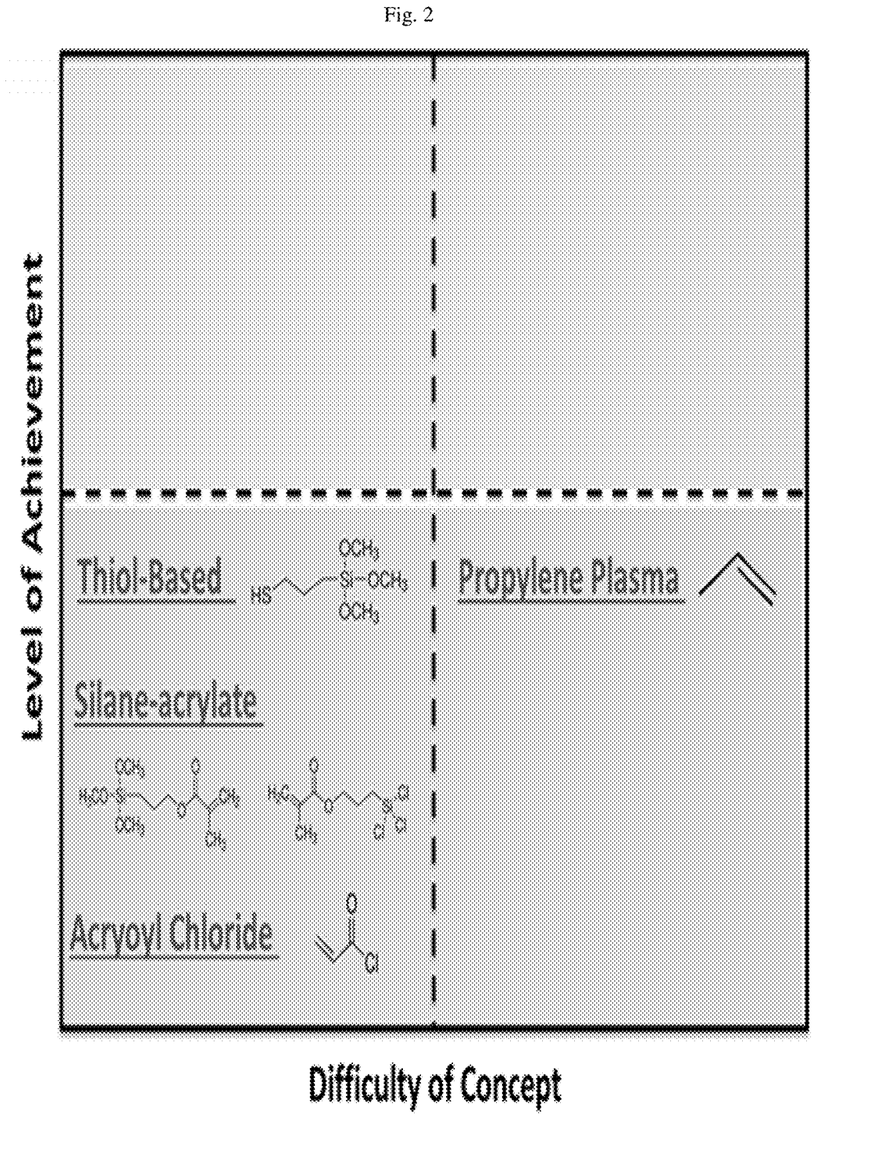
FIG. 2 is a list of potential surface chemistry treatments to increase an insulating polyimide film (Kapton®)/acrylated urethane (DYMAX® 204-CTH) adhesion.
Figure 3:
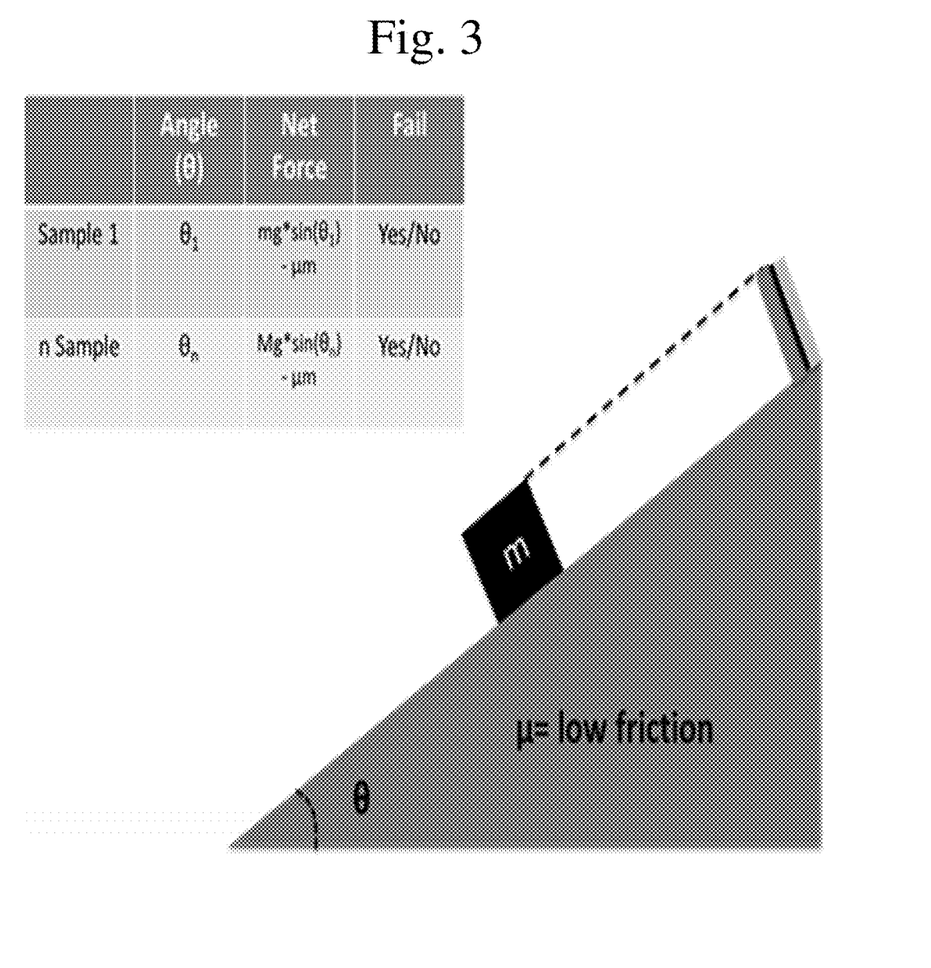
FIG. 3 is a schematic of conceptual peel-test model for film-to-film peel testing.

A basic model was developed to test and differentiate the adhesive potential of different chemistry treatments. The equation below describes a mass (m) on an incline frictionless plane with a range of angles theta (θ) attached to the testing polymer film. Under initial conditions and changes of weight and angle, there is a force magnitude (F) dependent on m and angle (θ), pulling at the adhesive interface of two polymer films.

$$F = mg * \sin(\theta) - \mu m$$

Depending on the final load and angle of testing, the force (F) defines the peeling force. FIG. 3 depicts a conceptualized peel-test model for the invention. The system used a weight set which totaled 1,000 grams (set: 500 grams (1), 200 grams (1), 100 grams (2), 50 grams (1), 20 grams (2), 10 grams (1)). A series of carts were built to hold the weights during testing. On one end, the cart had two metal plates with tightening bolts to hold the Kapton® film lip on a Kapton®-DYMAXO204-CTH adhesive-polyethylene terephthalate (PET) test sample. The bottom of the carts had a 1-inch thick Teflon® sheet; the same material was used to cover the surface of the sliding plane. Both Teflon® surfaces, on the carts and sliding plane, were polished to achieve a reduced friction contact surface to measure the peeling force between the polyimide film (Kapton®) adhered to PET via the acrylated urethane (DYMAX® 204-CTH).

Figure 4:
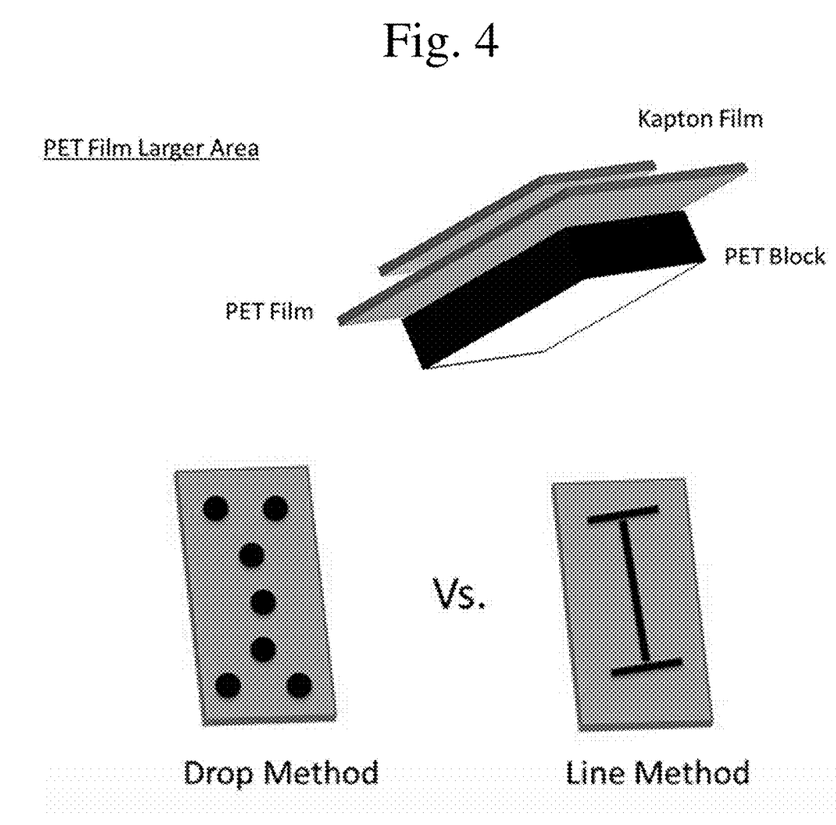
FIG. 4 shows a comparison between acrylated urethane (DYMAX® 204-CTH) drop dispensing and acrylated urethane (DYMAX® 204-CTH) line dispensing on a polyethylene terephthalate (PET) film. The difference between the methods is that adhesive line dispensing reduces over spill of adhesive along the length of the insulating polyimide film (Kapton®)-PET and uneven wetting on the top and bottom of the interface.

The PET-DYMAX® 204-CTH-Kapton® samples were optimized for the In-house Peel Test Device (IhPTD). Two important optimization steps were adopted to reduce data variability and false-positive adhesion. FIG. 4(top) shows the assembly of the Kapton®-DYMAX® 204-CTH-PET film sandwich onto a PET block. This process requires for the PET film (with dimensions of 1.5-inches width by 2.5 inches in length) to be larger than the Kapton® film (dimensions of 0.5-inch by 2-inches in length), and the PET block (dimensions of 1-inch width by 2-inches in length).

The following are the steps to prepare a peel test sample, as represented in FIG. 4:
- Cut the polyimide film (Kapton®) and PET film for its required sizes 1-inch in width by 3-inches in length and 1.5-inches in width by 2.5 inches in length respectively.
- Clean all polymer films using reagent alcohol and sonication for 5 minutes. Following with pressure air drying for chemistry treatment and control (plasma only).
- Cut control and treated polyimide film (Kapton®) into 0.5-inches in width by 2-inches in length for final testing dimension.
- Fold evenly at the 1-inch end of the polyimide film (Kapton®) film, this is the lip for attachment on the weight cart.
- Using a marker to delineate the polyimide film (Kapton®) adhesion area (0.5-inches width by 2-inches in length) on the larger PET film.
- Carefully and continuously dispense the acrylated urethane (DYMAX® 204-CTH) within the marker-delineated area following the line-method in the shape of an "I".
- After drawing the "I" on the PET, placing the polyimide film (Kapton®) by the lip and place it carefully on top of the PET film.
- Place the sample inside the UV hardening device, placing the PET facing towards the UV source. Use 2 minutes photo initiation and allow 60 minutes minimum to 2 days curing before adhesion testing.

Figure 5:
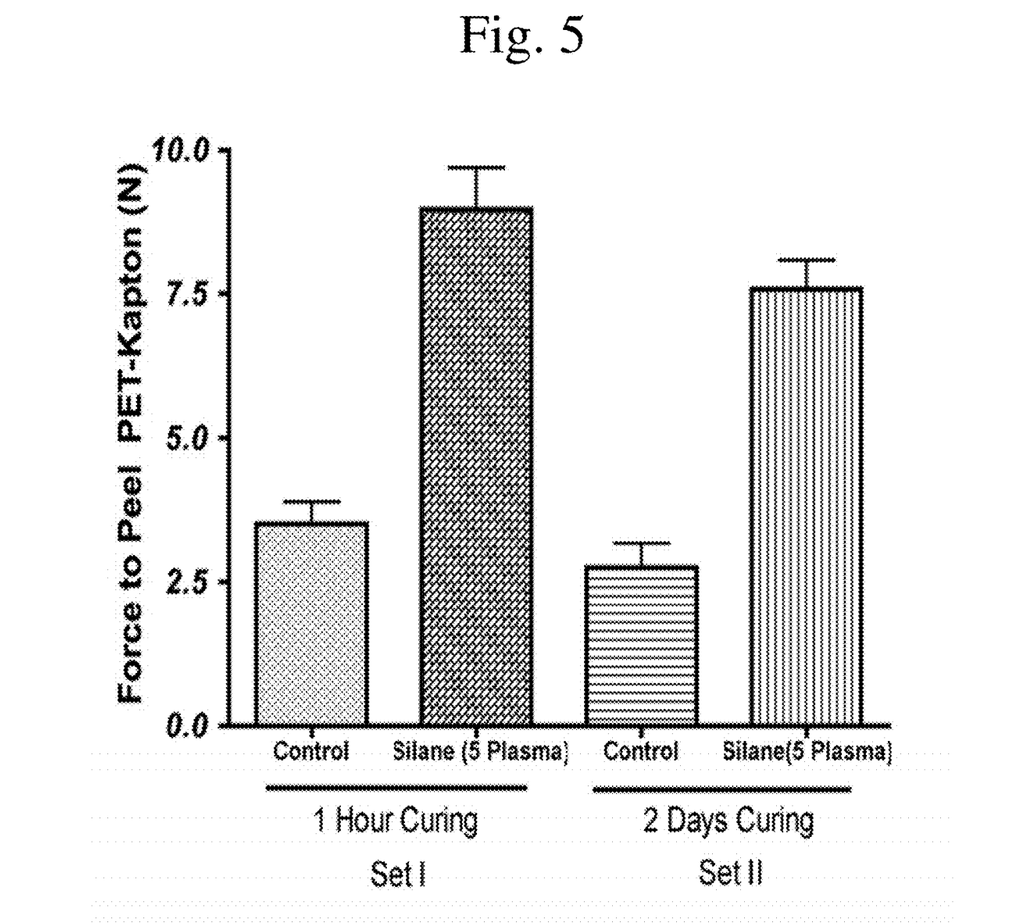
FIG. 5 is a graph comparing peel force between silane-treated insulating polyimide film (Kapton®) after 1 hour and 2 days curing.

Between the two treatments and respective controls (polyimide film (Kapton®), air plasma), means were higher after 1 hour of curing. However, the spread of the data (+/−SEM) in FIG. 5 shows no difference in the force to peel the polyimide film (Kapton®) from the PET film in either curing group. It is noted that a few samples from the 1 hour curing group had some of the polymerized acrylated urethane (DYMAX® 204-CTH) on the polyimide film (Kapton®) side after peeling even though the adhesive preferentially adheres to PET vs Kapton. This effect was not seen on any of the tested samples in the 2 day curing group.

Figure 6:
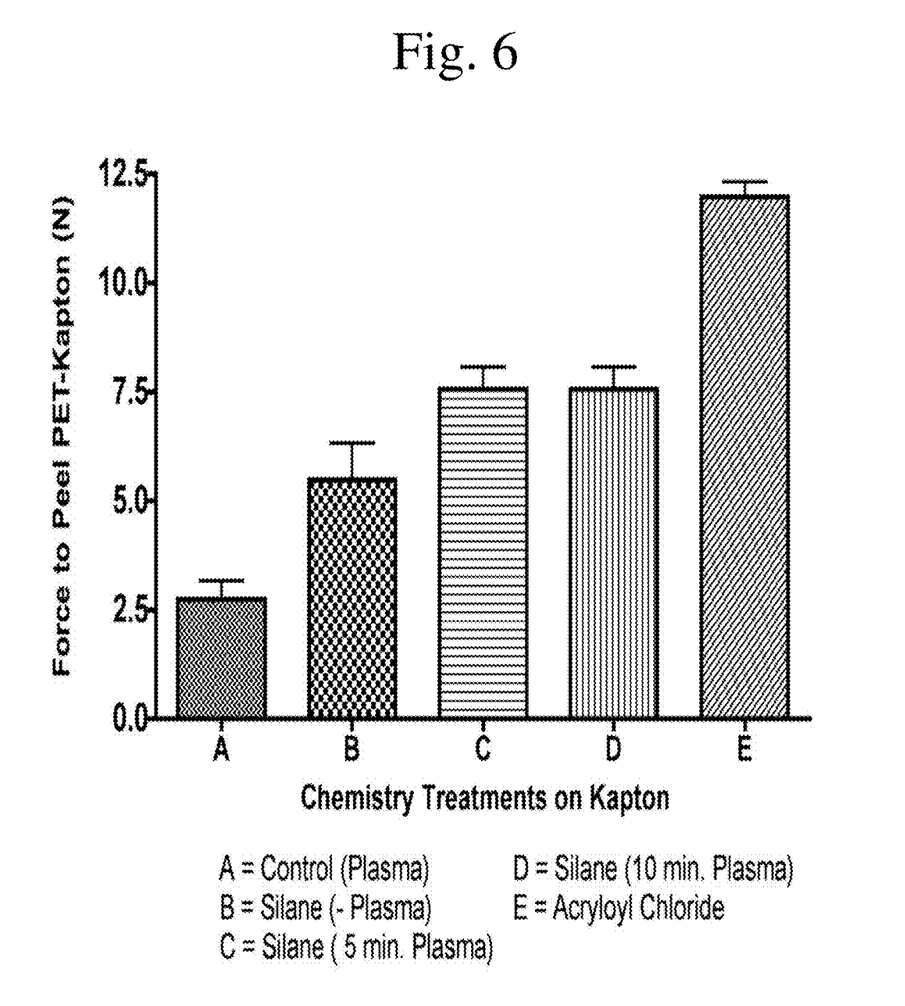
FIG. 6 is a graph comparing the effect of different chemistries on insulating polyimide film (Kapton®) adhesion to polyethylene terephthalate (PET).

FIG. 6 compares the effect of two different chemistries applied to the polyimide film (Kapton®) in the adhesive system (Kapton-Dymax-PET) after curing for two days. In this treatment group, several variables were tested such as plasma exposure and linker chemistry. It was found that the methacrylated silane and oxygen plasma increased adhesion of the polyimide film (Kapton®) towards PET in comparison to plasma alone, with a 3-fold difference. However, this effect does increase for longer plasma treatment (FIG. 6, C-D). Besides silane, the effect of acroyl chloride linker chemistry was tested and showed higher fold difference in adhesion when compared to control and silane, with a 4.6-fold and 1.5-fold respectively. Even though the fold different is large, this force to peel the polyimide film (Kapton®) from PET using acroyl chloride as a minimum value, adhesion exceeded the limit of the IhPTH.

The increased adhesion of a polyimide film (Kapton®) towards PET using acroyl chloride linker chemistry was visually assessed. For the control, plasma-treated and silane-treated cases (treatment of the polyimide), the acrylated urethane adhesive (DYMAX® 204-CTH) after peel testing routinely and reliably remained on the PET half of the glued pair of materials. In the case of acroyl halide-treated polyimide film (Kapton®), peel testing showed a reversal of preference for the surface to which the adhesive would adhere. This was visual confirmation the applied chemistry had had a positive effect on the strength of the polyimide film (Kapton®) adhesive bond.

Figure 7:
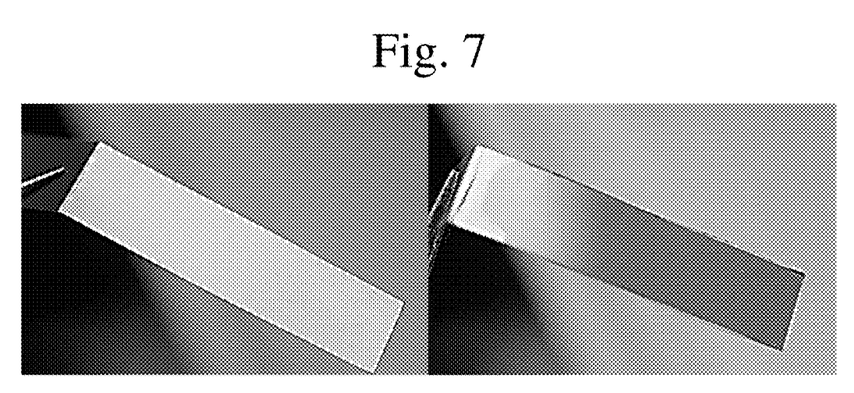
FIG. 7 shows photographs comparing visual evidence of the preferential adhesion of acrylated urethane (DYMAX® 204-CTH) towards acroyl chloride treated insulating polyimide film (Kapton®).

FIG. 7 is a representative image showing a comparison between control and acroyl chloride treated polyimide film (Kapton®). The left image of FIG. 7 shows the control polyimide film (Kapton®) samples did not have polymerized acrylated urethane (DYMAX 204-CTH) on the polyimide film (Kapton®), only on PET film after peeling. However, the right image of FIG. 7 shows acroyl treated polyimide film (Kapton®) had polymerized acrylated urethane (DYMAX® 204-CTH) after peeling, with none on the PET. This offers a potential correlation of the linker chemistry increasing adhesion of the (Kapton®) towards the acrylated urethane (DYMAX® 204-CTH) and PET.

We claim:

1. A composition comprising:
   a first material;
   an adhesive material attached to the first material;
   a plurality of linker molecules covalently bonded to the adhesive material using double bond functionalization; and
   a second material covalently bonded to the linker molecules,
   wherein the adhesive material comprises UV light curable adhesives, epoxy resins, cyanoacrylates, polymethylmethacrylate, acrylated urethanes or activator-cured adhesives,
   wherein the linker molecules comprise silane moieties, trimethoxysilane moieties, silane acrylate moieties, trimethoxysilane acrylate moieties, mercaptosilane moieties, mercaptoalkylsilane moieties, mercaptopropyltrimethoxysilane moieties, acryloyl moieties, alkylene moieties or phosphonic acids, and
   wherein a surface of the first material and a surface of the second material comprises a polymer, a metal, a ceramic, an alloy, silicon, and fabric, and wherein the polymer comprises polyamides, polyimides, polyurethanes, polyureas, polyamines, polyesters, polysulfonamides, polysulfides, polyetheretherketones or polyetherketoneketones,
   wherein the composition is an implantable medical device.

2. The composition of claim 1, wherein the adhesive material is bonded to surface functional groups of the first material.

3. The composition of claim 1, wherein the plurality of linker molecules are bonded to surface functional groups of the second material.

4. The composition of claim 1, wherein the first material is surface modified.

5. The composition of claim 1, wherein the second material is surface modified.

6. The composition of claim 1, wherein the first material is surface modified with plasma.

7. The composition of claim 1, wherein the second material is surface modified with plasma.

8. The composition of claim 1, further comprising a second plurality of linker molecules between the first surface and the adhesive material.

9. The composition of claim 8, further comprising a brush polymerized surface resulting in an increased plurality of linker molecules between the first surface and the adhesive.

10. The composition of claim 8, wherein the first and second plurality of linker molecules are the same.

11. The composition of claim 8, wherein the first and second plurality of linker molecules are different.

12. The composition of claim 8, wherein the linker molecules are coated with a primer which can activate the linker for more rapid reaction with the adhesive.

13. The composition of claim 1, further comprising a second adhesive material between the plurality of linker molecules and the second material.

14. The composition of claim 13, wherein the first and second adhesive materials are the same.

15. The composition of claim 13, wherein the first and second adhesive materials are different.

16. The composition of claim 1, wherein the plurality of linker molecules are covalently bonded to the second material using double bond functionalization.

17. The composition of claim 1, wherein the first material and the second material comprises a polymer, a metal, or an alloy.

* * * * *